US012674122B2

(12) United States Patent
Sonnek et al.

(10) Patent No.: US 12,674,122 B2
(45) Date of Patent: *\*Jul. 7, 2026**

(54) DIRECT RECTIFICATION OF MOLECULAR SIEVE REGENERANT AND METHOD OF USING THE SAME

(71) Applicant: IntegroEnergy Technologies LLC, Lake Crystal, MN (US)

(72) Inventors: Daniel W. Sonnek, Lake Crystal, MN (US); Kyle V. Lichty, Yankton, SD (US)

(73) Assignee: IntegroEnergy Technologies LLC, Lake Crystal, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/374,773

(22) Filed: Oct. 30, 2025

(65) Prior Publication Data

US 2026/0055352 A1      Feb. 26, 2026

Related U.S. Application Data

(63) Continuation of application No. 18/816,904, filed on Aug. 27, 2024.

(Continued)

(51) Int. Cl.
*B01D 3/36* (2006.01)
*B01D 3/00* (2006.01)
(Continued)

(52) U.S. Cl.
CPC .............. *C12H 6/02* (2019.02); *B01D 3/002* (2013.01); *B01D 3/143* (2013.01); *B01D 3/36* (2013.01); *B01D 5/006* (2013.01); *B01D*

*53/047* (2013.01); *B01D 53/261* (2013.01); *B01D 2253/108* (2013.01); *B01D 2257/80* (2013.01)

(58) Field of Classification Search
CPC .......... B01D 3/002; B01D 3/143; B01D 3/36; B01D 5/006; B01D 53/047; B01D 53/261; C12H 6/02
See application file for complete search history.

(56) References Cited

U.S. PATENT DOCUMENTS 7,297,236 B1 * 11/2007 Vander Griend ...... B01D 3/005
202/205
7,666,282 B2 * 2/2010 Sylvester ................ C07C 29/80
203/19

(Continued)

*Primary Examiner* — Jonathan Miller

(74) *Attorney, Agent, or Firm* — Fox Rothschild LLP

(57) ABSTRACT

The present disclosure relates to a method and a system for continuous regeneration of high-proof ethanol in a dry mill ethanol plant by a dual-rectification process that uses waste heat from the vacuum system, including routing azeotrope vapor comprising ethanol and water from the first rectifier to a molecular sieve vessel to produce pure, dry ethanol and routing the resulting regenerant to a second rectifier to produce a high-proof condensate that can be directly injected back into the MS vessel for an additional dehydration. The present invention also allows for simultaneous direct injection of azeotrope vapor from the first rectifier to the second rectifier to produce additional condensates that can be directly injected into the second rectifier for a continuous and cyclical feed-and-regeneration cycle for the production of pure, high-proof dry ethanol.

20 Claims, 2 Drawing Sheets

Related U.S. Application Data

(60) Provisional application No. 63/586,166, filed on Sep. 28, 2023.

(51) Int. Cl.
| | | |
|---|---|---|
| *B01D 3/14* | (2006.01) |
| *B01D 5/00* | (2006.01) |
| *B01D 53/047* | (2006.01) |
| *B01D 53/26* | (2006.01) |
| *C12H 6/02* | (2019.01) |

(56) References Cited

U.S. PATENT DOCUMENTS

| | | | | |
|---|---|---|---|---|
| 8,476,180 | B2 * | 7/2013 | Hilaly | B01J 29/90 |
| | | | | 502/30 |
| 9,068,700 | B2 * | 6/2015 | Sonnek | F17D 1/16 |
| 9,415,342 | B2 * | 8/2016 | Sonnek | B01D 53/0438 |
| 10,220,371 | B2 * | 3/2019 | Zaiser | H02J 3/0012 |
| 11,117,071 | B2 * | 9/2021 | Lucas | C07C 29/76 |
| 11,135,568 | B1 * | 10/2021 | Anderson | B01J 20/3491 |
| 11,376,521 | B2 * | 7/2022 | Lucas | F26B 11/028 |
| 11,697,630 | B2 * | 7/2023 | Andrade | B01D 3/145 |
| | | | | 203/19 |
| 11,779,858 | B2 * | 10/2023 | Andrade | B01D 15/203 |
| | | | | 203/19 |
| 2007/0088182 | A1 * | 4/2007 | Hilaly | B01J 20/3408 |
| | | | | 502/34 |
| 2007/0144886 | A1 * | 6/2007 | Sylvester | B01D 3/005 |
| | | | | 203/40 |
| 2010/0240524 | A1 * | 9/2010 | Hilaly | C07C 29/76 |
| | | | | 502/34 |
| 2012/0312385 | A1 * | 12/2012 | Sonnek | B01D 3/14 |
| | | | | 137/14 |
| 2015/0251128 | A1 * | 9/2015 | Sonnek | B01D 53/261 |
| | | | | 96/136 |
| 2019/0076751 | A1 * | 3/2019 | Lucas | B01D 3/002 |
| 2019/0336882 | A1 * | 11/2019 | Andrade | B01D 1/28 |
| 2020/0346131 | A1 * | 11/2020 | Lucas | C07C 29/76 |
| 2022/0048841 | A1 * | 2/2022 | Andrade | C07C 29/84 |
| 2023/0010850 | A1 * | 1/2023 | Righi | C07C 29/80 |

* cited by examiner

1

DIRECT RECTIFICATION OF MOLECULAR SIEVE REGENERANT AND METHOD OF USING THE SAME

CROSS-REFERENCE TO RELATED APPLICATIONS

This application is a continuation of U.S. patent application Ser. No. 18/816,904 filed Aug. 24, 2024, which claims the benefit of priority to U.S. Provisional Ser. No. 63/586, 166 filed Sep. 28, 2023, the disclosures of which are hereby incorporated by reference herein in their entireties.

FIELD

The present disclosure generally relates to a method and a system for direct rectification of molecular sieve regenerant for the continuous production of high-proof ethanol.

BACKGROUND

Conventional dry mill ethanol facilities have been typically designed to grind whole corn or similar grain to a fine flour (mash), hydrate, heat, expose to enzymes, and then hold at a relatively high temperature (i.e., the liquefaction step) to convert the grain starches into sugars. After liquefaction, the warm mash is sent through the fermentation process where the introduction of yeast converts the sugars to ethanol resulting in a fermented mixture often referred to as "beer." After fermentation, the beer is sent to a distillation system where it is the ethanol is extracted, purified, and concentrated, i.e., the proof is increased. During this step, the beer is stripped of solids and some of the water in a beer distillation column. The bottom product in the distillation column, also known as the "bottoms", contains water and precipitates that are sent for solids removal and the production of byproducts known as the Dried Distillers Grains and Solubles (DDGS). The accumulated vapors at the top of the distillation column are directed to a rectification column that will bring the ethanol concentration to the highest level that can be achieved mechanically resulting in an azeotropic mixture or an azeotrope of ethanol and water. For ethanol, the ethanol concentration of azeotrope is typically about 95% or 190 proof. However, to mix the ethanol readily with gasoline or to use it in other industrial and commercial products such as laboratory-grade solvents, paints, varnishes, and perfumes, the ethanol must be close to 100% or 200 proof. As such, a dehydration step is performed to obtain this purity.

Conventional dry mill ethanol facilities utilize pressure swing adsorption molecular sieves (MS) to complete the dehydration of the ethanol. The MS system removes water molecules from the azeotrope vapor by use of an MS media such as MS beads. During this step, pressurized, 190 proof (95%) azeotrope obtained from the distillation process is fed into an MS vessel containing these MS beads. During the dehydration process, pores in the MS beads capture the water molecules from the azeotrope vapor while the dried, purified ethanol passes through the beads, condenses into ethanol liquid, and is sent to storage. Once the MS beads are saturated with captured trapped water, the MS vessel is detached from the dehydration system and put into a regeneration ("regen") system, where the vacuum is pulled to a lower pressure. During this high-pressure to low-pressure swing, the specific volume of the vapor is increased and as a result, the captured water vapor is released from the beads and routed to the regen system.

During the regen step, the water vapor is condensed via a heat exchanger or a condenser. During this process, due to the low pressure required by the regen system, water cooling is utilized which results in waste heat released into the atmosphere during the regen process. The condensed vapor is recovered as the regen liquid. In a conventional dry mill system, this regen liquid is typically at 100 proof to 130 proof (50% v/v-65% v/v) ethanol concentration. This lower-proof regen liquid is then injected back into the distillation system where additional processing i.e., distillation and purification, is performed to raise the ethanol content of the regen liquid back to about 190 proof, and then routed to the dehydration system for further purification thus completing the cyclic process of ethanol production.

While this current system is ultimately able to ultimately produce high-proof ethanol, it is highly inefficient due to the lack of continuity between the distillation, dehydration, and regen systems as well as it produces a significant heat waste that is released into the atmosphere.

Thus, there is a need for a system and method for improving the energy efficiency of the plant, in particular, with respect to providing a high-throughput, continuous regeneration process without additional energy cost.

SUMMARY

The present disclosure relates generally to a method of continuous production of ethanol. In one aspect, a method of continuous production of ethanol includes: (a) introducing a mixture of ethanol and water to a first rectifier to produce an azeotrope comprising first water vapor and first ethanol vapor; (b) routing the azeotrope from the first rectifier to a first molecular sieve vessel comprising a first molecular sieve media, in an on-line operational status for dehydration of the azeotrope wherein the first water vapor and the first ethanol vapor are absorbed by the first molecular sieve media, thereby producing a first dry ethanol vapor and a first molecular sieve regenerant comprising water vapor and ethanol vapor absorbed in the first molecular sieve media; (c) condensing the first dry ethanol vapor to a first dry ethanol liquid and routing the first dry ethanol liquid to an ethanol storage; (d) changing operational status of the first molecular sieve vessel from the on-line operational status to a regeneration operational status, and changing the operational status of a second molecular sieve vessel comprising unsaturated second molecular sieve media to the on-line operational status of step (b); (e) releasing the first molecular sieve regenerant from the first molecular sieve vessel in the regeneration operational status and routing the first molecular sieve regenerant to a second rectifier to produce a first rectified vapor, and routing the first rectified vapor to a regen condenser to produce a first condensate; (f) routing the first condensate to the second molecular sieve vessel in the on-line operational status for the dehydration, wherein water vapor and ethanol vapor in the first condensate are absorbed by the second molecular sieve media, thereby producing a second dry ethanol vapor and a second molecular sieve regenerant comprising water vapor and ethanol vapor absorbed in the second molecular sieve media; and (g) condensing the second dry ethanol vapor to a second dry ethanol liquid and routing the second dry ethanol liquid to the ethanol storage. In another embodiment, the method may further include routing the second molecular sieve regenerant of step (f) to the second rectifier to produce a second rectified vapor and routing the second rectified vapor to the regen condenser to produce a second condensate for the dehydration.

In one embodiment, the mixture of ethanol and water in step (a) is from about 20 proof to about 190 proof ethanol concentration. In another embodiment, the azeotrope in step (a) has an ethanol concentration of about 190 proof. In another embodiment, the ethanol concentration of the first molecular sieve regenerant in step (b) is from about 100 proof to about 130 proof. In another embodiment, the first rectified vapor in step (e) has an ethanol concentration from about 180 proof to about 190 proof. In another embodiment, the dehydration in step (b) is performed at a pressure from about 20 psia to about 75 psia. In another embodiment, the dehydration in step (b) is performed at a temperature from about 200° F. to about 320° F. In another embodiment, the first condensate in step (e) has an ethanol concentration from about 180 proof to about 190 proof. In another embodiment, the second rectifier is operated at a pressure from about 1 psia to about 3 psia. In another embodiment, the second rectifier is operated at a temperature from about 120° F. to about 130° F. In another embodiment, the first molecular sieve regenerant in step (e) is released at a pressure of about 2 psia to about 20 psia. In another embodiment, the first molecular sieve regenerant in step (e) is released at a temperature from about 200° F. to about 300° F. In another embodiment, the second molecular sieve regenerant in step (f) has an ethanol concentration from about 100 proof to about 130 proof. In another embodiment, the releasing of the first molecular sieve regenerant in step (e) provides up to about 80% energy required to operate the second rectifier.

In another embodiment, the method further includes routing some of the azeotrope from the first rectifier directly to the second rectifier to produce a third rectified vapor and routing the third rectified vapor from the second rectifier to the regen condenser to produce a third condensate for the dehydration. In another embodiment, the third condensate is routed to the first molecular sieve vessel in the on-line operational status or the second molecular sieve vessel in the on-line operational status for the dehydration, wherein water vapor and ethanol vapor in the third condensate are absorbed by the first molecular sieve media or the second molecular sieve media, thereby producing a third dry ethanol vapor and a third molecular sieve regenerant comprising water vapor and ethanol vapors absorbed in the first molecular sieve media or the second molecular sieve media.

In another embodiment, the method further includes condensing the third dry ethanol vapor to a third dry ethanol liquid and routing the third dry ethanol liquid to the ethanol storage. In various embodiments, the third molecular sieve regenerant may be routed to the second rectifier to produce a fourth rectified vapor and routing the fourth rectified vapor to the regen condenser to produce a fourth condensate for dehydration.

In another aspect, the disclosed technology relates to a system for continuous production of ethanol, including: a first rectifier, a second rectifier, a molecular sieve vessel, an ethanol storage container, a regen condenser, a pump, and a regen tank, wherein (a) the first rectifier is configured to: (i) receive a mixture comprising ethanol and water; (ii) provide the mixture comprising ethanol and water to the molecular sieve vessel; and (iii) provide the mixture comprising ethanol and water to the second rectifier; (b) the second rectifier is configured to: (i) receive the mixture comprising ethanol and water from the first rectifier; (ii) receive a vapor comprising ethanol and water from the molecular sieve vessel; and (iii) provide the vapor comprising ethanol and water to the regen condenser to produce a condensed vapor comprising ethanol and water; (c) the pump is configured to: (i) route the condensed vapor from the regen condenser to the regen tank; and (ii) route the condensed vapor from the regen tank to the molecular sieve vessel; and (e) the molecular sieve vessel is configured to: (i) receive the mixture comprising ethanol and water from the first rectifier; (ii) receive the condensed vapor from the regen tank; (iii) provide dehydrated ethanol to the ethanol storage container; and (iv) provide the vapor comprising ethanol and water to the second rectifier.

The details of one or more aspects of the disclosure are set forth in the description below. Other features, objects, and advantages of the technique described in this disclosure will be apparent from the description and from the claims.

BRIEF DESCRIPTION OF THE DRAWINGS

The accompanying drawings, which are incorporated herein and constitute part of this specification, are illustrative of particular embodiments of the present disclosure and do not limit the scope of the present disclosure. The drawings are not to scale and are intended for use in conjunction with the explanations in the following detailed description.

DETAILED DESCRIPTION

Figure 1:
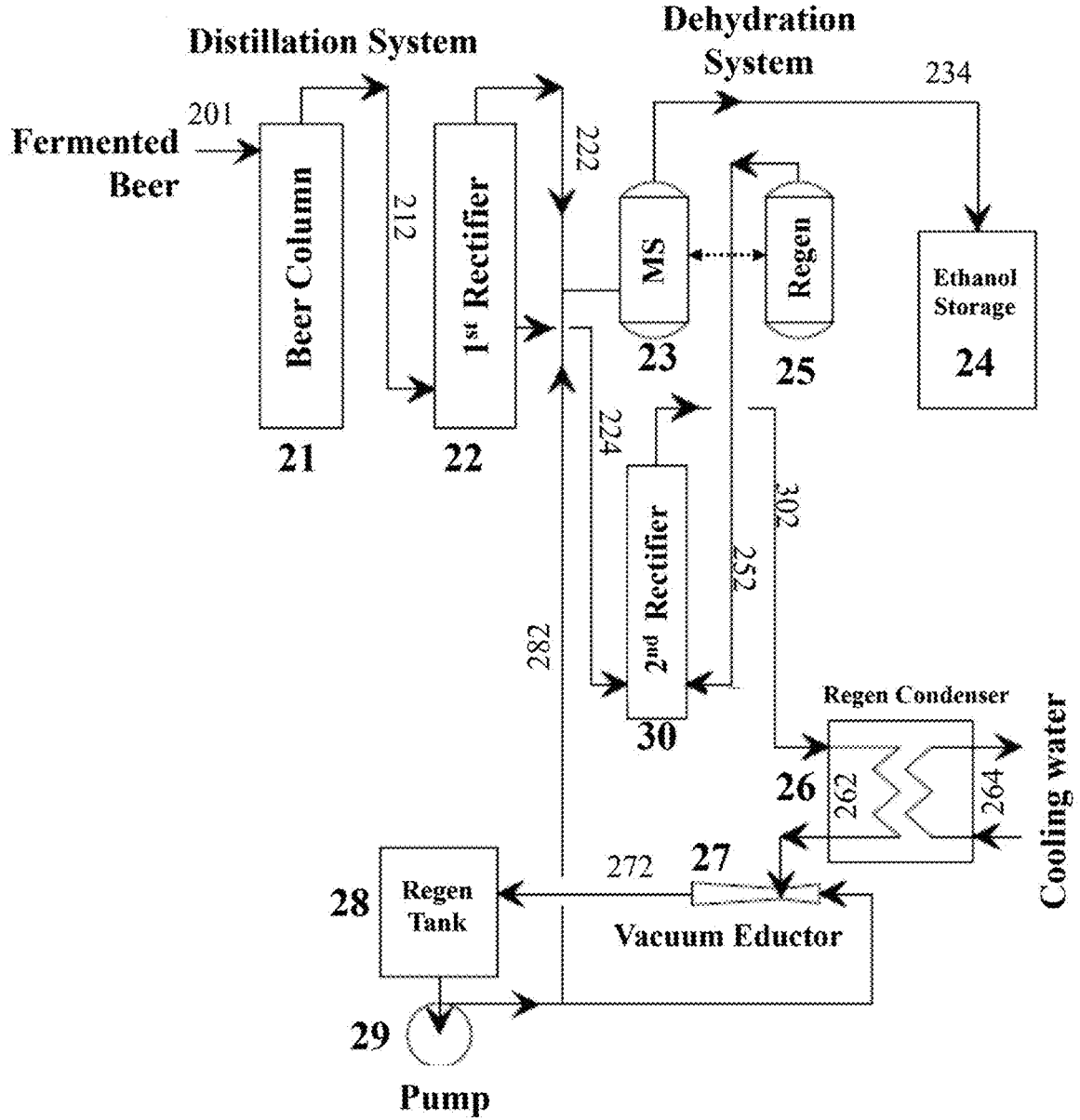
FIG. 1 is a schematic that depicts an example of a system and method of the present disclosure incorporating a second rectification column to the regen step of ethanol production.

The following discussion omits or only briefly describes conventional features of the disclosed technology that are apparent to those skilled in the art. Reference to various embodiments does not limit the scope of the claims attached hereto. Additionally, any examples set forth in this specification are intended to be non-limiting and merely set forth some of the many possible embodiments for the appended claims. Further, particular features described herein can be used in combination with other described features in each of the various possible combinations and permutations. A person of ordinary skill in the art would know how to use the instant invention, in combination with routine experiments, to achieve other outcomes not specifically disclosed in the examples or the embodiments.

Unless otherwise specifically defined herein, all terms are to be given their broadest possible interpretation including meanings implied from the specification as well as meanings understood by those skilled in the art and/or as defined in dictionaries, treatises, etc. Unless defined otherwise, all technical and scientific terms used herein have the same meaning as commonly understood by one of ordinary skill in the art in the field of the disclosed technology. It must also be noted that, as used in the specification and the appended claims, the singular forms "a", "an", and "the" include plural referents unless otherwise specified, and that the terms "includes" and/or "including," when used in this specification, specify the presence of stated features, elements, and/or components, but do not preclude the presence or addition of one or more other features, steps, operations, elements, components, and/or groups thereof. Additionally, methods, equipment, and materials similar or equivalent to those described herein can also be used in the practice or testing of the disclosed technology.

As used herein, the term "about" means plus or minus 10% of the numerical value of the number with which it is being used. Accordingly, about 50% means in the range of 45%-55%.

Unless otherwise indicated, all percentage (%) values are volume/volume (v/v).

Throughout the specification of the application, various terms are used such as "first," "second," and the like. These terms are words of convenience in order to distinguish between different elements, and such terms are not intended to be limiting as to how the different elements may be utilized.

In conventional ethanol production, after liquefaction and fermentation of the warm mash, the fermented beer is routed to a beer column where solid precipitate and vapor are separated. The beer is then routed to a rectifier to raise the concentration of the vapor to produce an azeotropic mix of ethanol and water vapors, i.e., an azeotrope. As used herein, the term "azeotrope" may refer to a mixture of ethanol and water in proportions in the vaporous form that are similar to the liquid form. As used herein, the terms "azeotrope" and "azeotrope vapor" may be used interchangeably. In various embodiments, the ethanol concentration of the azeotrope may be about 190 proof.

The azeotrope vapor is routed to a dehydration system comprising a molecular sieve (MS) vessel containing water absorbing, or water trapping MS media to obtain dry ethanol in a concentration of about 200 proof. In various embodiments, MS media may comprise porous, zeolite beads, known as MS beads. During the dehydration step, the azeotrope vapor is fed into an MS vessel where the MS media captures the water molecules while the dried, purified ethanol vapor passes through the media and condenses into a concentrated, 200 proof ethanol.

The MS vessel, which contains saturated MS media is then removed and put into a separate regeneration (regen) system, comprising a regen vessel, and a regen condenser that is driven by a vacuum system. During the regen process, the pressure is lowered to about 3 psia. This high-to-low pressuring swing causes an increase in the specific volume of the trapped vapors and results in the water molecules being forced out of the MS media as water vapor. The water vapor is then routed to the regen condenser where the vapor condenses into a liquid. This condensed liquid, also known as the regen liquid, is recovered at about 100 proof to about 130 proof ethanol and may be suitable to be injected back into the distillation system. In a conventional system, this feed and regen cycle is discontinuous and may occur every 3 to 10 minutes depending on the size of the MS vessels and the associated feed rate of the plant.

Figure 2:
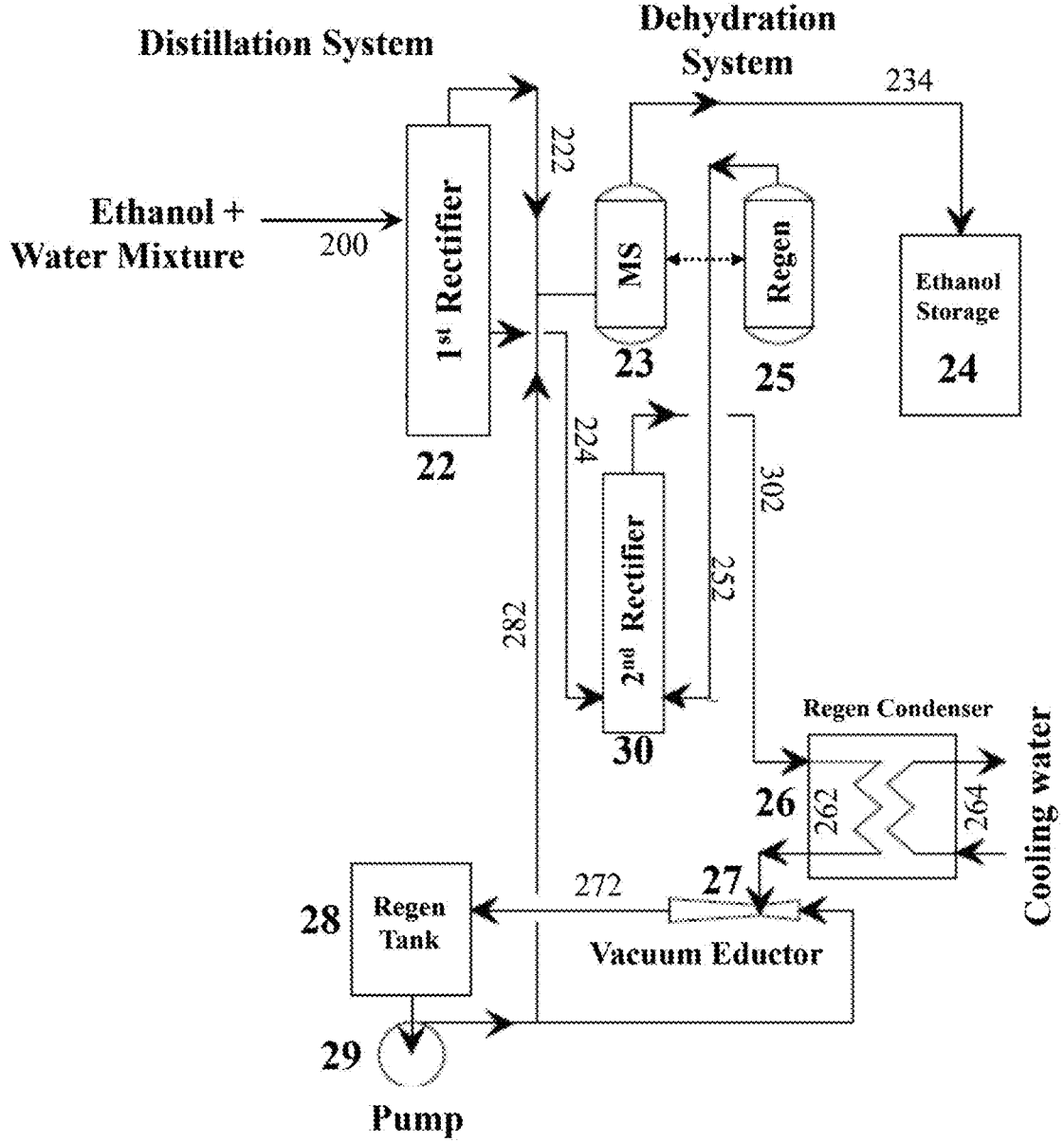
FIG. 2 is a schematic that depicts another example of a system and method of the present disclosure introducing an ethanol and water mixture directly into the first rectifier.

Referring now to FIGS. 1 and 2, a system and process of the present disclosure are shown. In various embodiments, with respect to the conventional dry mill system as described above, second rectifier 30 is incorporated into the regen system. In various embodiments, this dual-rectifier system of the present invention comprising a first rectifier that simultaneously provides azeotrope vapors to both the MS vessel 23 and the second rectifier 30 allows for a continuous feed and regen cycle for the production of high-proof ethanol.

In various embodiments as seen in FIG. 1, after liquefaction and fermentation of the warm mash, the fermented beer is routed to a distillation system through lines 201 and 212 comprising a beer column 21 and a first rectifier 22 to produce an azeotrope vapor. In some embodiments as seen FIG. 2, a starting ethanol and water mixture may be routed directly to the first rectifier 22 through line 200. It should be understood that parts with same numbering in FIGS. 1 and 2 describe the same or substantially the same features and/or operational methods. In various embodiments, the ethanol concentration of the starting ethanol and water mixture may be from about 80 proof to about 130 proof. In various embodiments, the azeotrope vapor may comprise from about 40% to about 70% of the total volume of the starting ethanol and water mixture.

The azeotrope vapor produced from the first rectifier 22 is then routed through line 222 to the molecular sieve vessel 23 in an on-line operational status for dehydration wherein water vapor and dry ethanol vapor are separated from the azeotrope vapor using MS media thereby producing first dry ethanol vapor (about 200 proof) and first MS regenerant trapped in the MS media comprising water vapor and some, residual ethanol vapor. As used herein the terms "MS regenerant" and "MS regenerant vapor" may be used interchangeably. As used herein, "on-line operational status" refers to an MS vessel that is configured for dehydration of azeotrope vapor to produce dry ethanol vapor for storage and MS regenerant for the regen process. In various embodiments, the ethanol concentration of the first MS regenerant may be from about 100 to about 130 proof. In various embodiments, the ethanol comprises from about 85% to about 95% of the total volume of the introduced azeotrope vapor. In various embodiments, the MS regenerant comprises from about 7% to about 15% of the total volume of the introduced azeotrope vapor.

In various embodiments, MS media may comprise porous, zeolite beads, known as MS beads. In some embodiments, the dehydration system may include multiple molecular sieve vessels, i.e., a first molecular sieve vessel and a second molecular sieve vessel in different operational statuses. In various embodiments, when the MS media in a first molecular sieve vessel is saturated with MS regenerant, the operational status of the first molecular sieve vessel may be changed from on-line operational status to a regeneration operational status, i.e., regen vessel 25 (as indicated by dashed arrow in FIGS. 1 and 2), while simultaneously changing the status of a second molecular sieve vessel (not shown) with unsaturated MS media to on-line operational status, i.e., taking place of MS vessel 23, to continuously produce high-proof dry ethanol and MS regenerant from the routed azeotrope. As used herein, "regeneration operational status" refers to an MS vessel that is configured to release the absorbed MS regenerant from the MS media and route the MS regenerant to the second rectifier to produce rectified vapor.

As shown in FIG. 2, after the dehydration step in MS vessel 23, the first dry ethanol vapor condenses to first dry ethanol liquid and is routed through line 234 to the ethanol storage 24 while the first MS regenerant is released from the MS media and is routed to the second rectifier 30 (in regeneration operational status, i.e., from regen vessel 25) to produce a first rectified vapor comprising ethanol and water. In various embodiments, the ethanol concentration of the first rectified vapor may be from about 180 proof to about 190 proof. In various embodiments, the first rectified vapor comprises from about 7% to about 15% of the total volume of the routed MS regenerant.

In various embodiments, the MS regenerant exits the regen vessel 25 through line 252 at a pressure of about 2 psia to about 20 psia, and a temperature of about 200° F. to about 300° F. thereby supplying the second rectifier 30 with heat and feed required to drive the rectification process. In some embodiments, the expelled MS regenerant under these high-pressure and high-temperature conditions provides at least some of the energy required to drive the second rectifier 30, for example, a majority of the energy, up to about 80%. This direct transfer of energy not only results in reduced energy requirements, but also reduces or eliminates the waste heat energy commonly present in conventional dry mill ethanol facilities.

In various embodiments, the waste heat expelled during the condensing of the first rectified vapor in the regen vacuum system may be used to drive the second rectifier 30. In various embodiments, the regen vacuum system may comprise a regen condenser 26, a vacuum eductor 27, a regen tank 28, and a pump 29. In various embodiments, the second rectifier 30 is operated under a pressure range from about 1 psi to about 3 psia and a temperature range from about 120° F. to about 130° F.

After the distillation and dehydration, the first MS regenerant is routed through line 252 to the second rectifier 30 where additional distillation and purification steps (i.e., rectification steps) are performed to further raise the ethanol concentration/proof, producing a first rectified vapor comprising ethanol and water. The first rectified vapor is then routed through line 302 to the regen condenser 26 and condenses to a first condensate. In some embodiments, regen condenser 26 operates by routing cooling water through line 264. In various embodiments, the regen condenser 26 may be configured to condense ethanol and water vapor mixture up to ethanol concentration of up to 190 proof. In various embodiments, the first condensate comprises from about 85% to about 90% of the total volume of the routed rectified vapor. The first condensate recovered from this process is from about 190 proof ethanol which is almost about 70% to about 90% purity enhancement compared to about 100 proof to about 130 proof regen liquid obtained from the conventional method of dry mill ethanol production. This higher proof first condensate may be routed through the vacuum eductor 27 by line 262 and to regen tank 28 through line 272, and/or may be circulated back through line 282 to an on-line operational status molecular sieve (i.e., MS vessel 23) to provide additional dehydration step to produce about 200 proof, second dry ethanol vapor, and an additional MS regenerant, i.e., a second MS regenerant for continuous ethanol production. In some embodiments, the second dry ethanol vapor may be condensed into a second dry ethanol liquid and routed to the ethanol storage 24. In various embodiments, upon changing the operational status from on-line operational status to a regeneration operational status (i.e., MS vessel 23 to regen vessel 25), the second MS regenerant may be routed to the second rectifier 30 to produce a second rectified vapor. In some embodiment, the second rectified vapor may be routed to a regen condenser 26 to produce a second condensate.

In various embodiments, the regen system of FIG. 2 may include a supplemental feedline from the first rectifier 22 directly feed up to about 15% of the vapor to the second rectifier 30 through line 224, to provide additional unloading of azeotrope vapor and simultaneously drive the distillation and regeneration processes for continuous ethanol production.

In various embodiments, azeotrope vapor produced from the first rectifier 22 may be routed to the second rectifier 30 through line 224 bypassing a dehydration step. The azeotrope vapor that is fed directly to the second rectifier 30 is converted to a third rectified vapor and is routed to the regen condenser 26 where it condenses into third condensate. In various embodiments, the waste heat expelled during the condensing of the third rectified vapor may be used to drive the second rectifier 30. The third condensate recovered from this process is at about 190 proof and is suitable for direct injection into an on-line MS vessel (i.e., MS Vessel 23) for the dehydration process. In various embodiments, the third condensate comprises from about 10% to about 15% of the total volume of the routed third rectified vapor. The third condensate may be stored in the regen tank 28, and/or may be circulated to the MS vessel 23 through line 282 for an additional dehydration step to produce about 200 proof, third dry ethanol vapor, and additional MS regenerant, i.e., third MS regenerant, for continuous ethanol production. In some embodiments, the third dry ethanol vapor may be condensed into a third dry ethanol liquid and routed to the ethanol storage 24. In various embodiments, the third MS regenerant may be routed back to the second rectifier 30 to produce a fourth rectified vapor. In some embodiment, the fourth rectified vapor may be routed to a regen condenser 26 to produce a fourth condensate to be routed to the dehydration system.

In various embodiments, this direct dual-rectifier process may be driven by either pressure or vacuum rectification and may operate at a pressure range from about 5 psia to about 150 psia, about 25 psia to about 125 psia, about 50 psia to about 100 psia, about 5 psia to about 50 psia, about 50 psia to about 75 psia, about 75 psia to about 100 psia, about 100 psia to about 120 psia, or about 120 psia to about 150 psia. In various embodiments, the vacuum for the regeneration system may comprise regen condenser 26, vacuum eductor 27, regen tank 28, and pump 29.

The above process may include a continuous ethanol production comprising a cyclical regeneration of MS regenerants, rectified vapors, and condensates from the starting feed, i.e., fermented beer, or ethanol and water mixture. For example, when the azeotrope from the first rectifier 22 reaches the MS vessel 23 to produce MS regenerant and dry ethanol vapor, the MS regenerant (with MS vessel 23 now in regeneration operational status, i.e., regen vessel 25) is routed to the second rectifier 30 where rectified vapor is produced and converted into condensate. This condensate is circulated back to an on-line operation MS vessel where additional dry ethanol vapor is produced, and the MS regenerant is regenerated. This regenerated MS regenerant (with MS vessel 23 now in regeneration operational status, i.e., regen vessel 25) is routed to the second rectifier 30 to continue the cycle of feed and regeneration.

At the same time, some of the azeotrope from the first rectifier 22 may be routed directly to the second rectifier 30 through line 224 to produce an additional rectified vapor. The rectified vapor produced from this step is then routed to the condenser to produce an additional condensate. The condensate produced from this step is then routed to the MS vessel 23 (i.e., in on-line operational status) to produce dry ethanol vapor which is converted to dry ethanol liquid, and MS regenerant which is routed to the second rectifier 30 (from regeneration status, i.e., regen vessel 25) to continue the cycle of feed and regeneration.

Thus, the disclosed process may be run continuously in terms of supplying feed, i.e., MS regenerant, rectified vapor, and condensate to the second rectifier, regen condenser, and MS vessel respectively, with periodic condensing of the produced dry ethanol vapor into dry ethanol liquid. Accordingly, the expelled MS regenerant from this cyclical feed and regeneration provides the energy required to drive the second rectifier 30 and the regen system.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the following claims.

All references cited and/or discussed in this specification are incorporated herein by reference in their entirety and to the same extent as if each reference was individually incorporated by reference.

What is claimed is:

1. A method of continuous production of ethanol comprising:

(a) introducing a mixture of ethanol and water to a first rectifier to produce an azeotrope comprising first water vapor and first ethanol vapor;

(b) routing the azeotrope from the first rectifier to a first molecular sieve vessel comprising a first molecular sieve media, in an on-line operational status for dehydration of the azeotrope wherein the first water vapor and the first ethanol vapor are absorbed by the first molecular sieve media, thereby producing a first dry ethanol vapor and a first molecular sieve regenerant comprising water vapor and ethanol vapor absorbed in the first molecular sieve media;

(c) condensing the first dry ethanol vapor to a first dry ethanol liquid and routing the first dry ethanol liquid to an ethanol storage;

(d) changing operational status of the first molecular sieve vessel from the on-line operational status to a regeneration operational status, and changing the operational status of a second molecular sieve vessel comprising unsaturated second molecular sieve media to the on-line operational status of step (b);

(e) releasing the first molecular sieve regenerant from the first molecular sieve vessel in the regeneration operational status and routing the first molecular sieve regenerant to a second rectifier to produce a first rectified vapor, and routing the first rectified vapor to a regen condenser to produce a first condensate;

(f) routing the first condensate to the second molecular sieve vessel in the on-line operational status for the dehydration, wherein water vapor and ethanol vapor in the first condensate are absorbed by the second molecular sieve media, thereby producing a second dry ethanol vapor and a second molecular sieve regenerant comprising water vapor and ethanol vapor absorbed in the second molecular sieve media; and (g) condensing the second dry ethanol vapor to a second dry ethanol liquid and routing the second dry ethanol liquid to the ethanol storage.

2. The method of claim 1, further comprising routing the second molecular sieve regenerant of step (f) to the second rectifier to produce a second rectified vapor and routing the second rectified vapor to the regen condenser to produce a second condensate for the dehydration.

3. The method of claim 1, wherein the mixture of ethanol and water in step (a) is from about 20 proof to about 190 proof ethanol concentration.

4. The method of claim 1, wherein the azeotrope in step (a) has an ethanol concentration of about 190 proof.

5. The method of claim 1, wherein the first molecular sieve regenerant in step (b) has an ethanol concentration from about 100 proof to about 130 proof.

6. The method of claim 1, wherein the first rectified vapor in step (e) has an ethanol concentration from about 180 proof to about 190 proof.

7. The method of claim 1, wherein the dehydration in step (b) is performed at a pressure from about 20 psia to about 75 psia.

8. The method of claim 1, wherein the dehydration in step (b) is performed at a temperature from about 200° F. to about 320° F.

9. The method of claim 1, wherein the first condensate in step (e) has an ethanol concentration from about 180 proof to about 190 proof.

10. The method of claim 1, wherein the second rectifier is operated at a pressure from about 1 psia to about 3 psia.

11. The method of claim 1, wherein the second rectifier is operated at a temperature from about 120° F. to about 130° F.

12. The method of claim 1, wherein the first molecular sieve regenerant in step (e) is released at a pressure of about 2 psia to about 20 psia.

13. The method of claim 1, wherein the first molecular sieve regenerant in step (e) is released at a temperature from about 200° F. to about 300° F.

14. The method of claim 1, wherein the second molecular sieve regenerant in step (f) has an ethanol concentration from about 100 proof to about 130 proof.

15. The method of claim 1, wherein the releasing of the first molecular sieve regenerant in step (e) provides up to about 80% energy required to operate the second rectifier by direct transfer of energy.

16. The method of claim 1, comprising a step simultaneous with step (b), of routing some of the azeotrope from the first rectifier directly to the second rectifier to produce a third rectified vapor and routing the third rectified vapor from the second rectifier to the regen condenser to produce a third condensate for the dehydration.

17. The method of claim 16, wherein the third condensate is routed to the first molecular sieve vessel in the on-line operational status or the second molecular sieve vessel in the on-line operational status for the dehydration, wherein water vapor and ethanol vapor in the third condensate are absorbed by the first molecular sieve media or the second molecular sieve media, thereby producing a third dry ethanol vapor and a third molecular sieve regenerant comprising water vapor and ethanol vapors absorbed in the first molecular sieve media or the second molecular sieve media.

18. The method of claim 17, further comprising condensing the third dry ethanol vapor to a third dry ethanol liquid and routing the third dry ethanol liquid to the ethanol storage.

19. The method of claim 17, further comprising routing the third molecular sieve regenerant to the second rectifier to produce a fourth rectified vapor and routing the fourth rectified vapor to the regen condenser to produce a fourth condensate for the dehydration.

20. A system for continuous production of ethanol comprising:

a first rectifier, a second rectifier, a molecular sieve vessel, an ethanol storage container, a regen condenser, a pump, and a regen tank, wherein:

(a) the first rectifier is configured to:

(i) receive a mixture comprising ethanol and water;

(ii) provide the mixture comprising ethanol and water to the molecular sieve vessel; and iii) provide the mixture comprising ethanol and water to the second rectifier;

(b) the second rectifier is configured to:

(i) receive the mixture comprising ethanol and water from the first rectifier;

(ii) receive a vapor comprising ethanol and water from the molecular sieve vessel; and (iii) provide the vapor comprising ethanol and water to the regen condenser to produce a condensed vapor comprising ethanol and water;

(c) the pump is configured to:

(i) route the condensed vapor from the regen condenser to the regen tank; and (ii) route the condensed vapor from the regen tank to the molecular sieve vessel; and (d) the molecular sieve vessel is configured to:

(i) receive the mixture comprising ethanol and water from the first rectifier;

(ii) receive the condensed vapor from the regen tank;

(iii) provide dehydrated ethanol to the ethanol storage container; and (iv) provide the vapor comprising ethanol and water to the second rectifier.

* * * * *